June 5, 1945.　　　　A. G. BODINE, JR　　　　2,377,607
METHOD AND APPARATUS FOR FORMING A CHARGE
Filed June 10, 1940　　　　2 Sheets-Sheet 1

INVENTOR
ALBERT G. BODINE, JR.
BY HARRIS, KIECH, FOSTER & HARRIS
Florence F. Kiech
FOR THE FIRM
ATTORNEYS.

Patented June 5, 1945

2,377,607

UNITED STATES PATENT OFFICE 2,377,607

METHOD AND APPARATUS FOR FORMING A CHARGE

Albert G. Bodine, Jr., Burbank, Calif.

Application June 10, 1940, Serial No. 339,736

21 Claims. (Cl. 123—127)

My invention relates to a control system adapted for use with an internal combustion engine and, more particularly, to a novel method and apparatus using changes in manifold vacuum for operating a control element which may be associated with the fuel-supply controller of the engine or with various other devices.

The invention is applicable to all carburetor-type or pressure-regulator type combustion engines, whether operating on a normally liquid fuel (such as gasoline, kerosene, etc.), or on gaseous fuels derived from a normally gaseous liquefied hydrocarbon (such as propane, butane, and various mixtures thereof), or on other fuels (such as ethane, methane, charcoal gas, natural gas, etc.).

The invention will be first exemplified with reference to the control of the fuel mixture. In this connection, the invention can be used to proportion the fuel into the air stream to secure different air-fuel mixtures to meet varying load conditions, or it can be used to add fuel components or fuel supplements to meet such changing conditions. The fuel component or fuel supplement may be a combustible material or a material facilitating combustion, and one important use of the invention is to proportion anti-knock or other material into the engine as required by load conditions.

It is an object of the present invention to provide a novel method and apparatus for proportioning a material to an internal combustion engine and, in the preferred embodiment, for proportioning a fuel, fuel complement, or fuel supplement to the air intake passage of such an engine.

Another object of the invention is to proportion a material to an internal combustion engine in response to the torque being developed by the engine so that the amount of material will be varied as the torque developed increases and decreases. Thus, fuel or a component or supplement thereof can be delivered to the engine, for example to the air intake passage thereof, in such amount as to give a combustible mixture meeting the needs of the engine at different operating conditions. This mode of operation is to be contradistinguished from the delivery of such a material in response to changes in horse power output, as will be hereinafter discussed.

Still another object of the invention is to provide a novel torque-responsive economizer for an internal combustion engine.

One of the important features of the invention resides in using the subatmospheric pressure in a portion of the air intake passage of an internal combustion engine for drawing thereinto a small stream of air or other gas. This stream of air is drawn through a control chamber and is appropriately throttled to maintain in this control chamber a vacuum or an absolute pressure which varies proportionally with the vacuum or absolute pressure in the air intake passage as established by operation of the engine. It is an object of the present invention to provide such a control chamber and to use the varying pressure therein either for metering purposes or for more general control purposes.

When using the device for varying fuel mixtures, the intermediate pressure in the control chamber is used to vary the amount of fuel mixed with the air. If the device is to be made torque-responsive, it is desirable that the air drawn through the control chamber should be controlled by the vacuum or absolute pressure at a position on the down-stream or engine side of the butterfly valve or other throttle. If the point of communication is upstream from the butterfly, for example between the butterfly and a Venturi-type mixing chamber, the operation of the device would be subject to the total mass of air flowing per unit of time through the venturi, and the mixture would change as a function of speed of the engine. Such a system would be responsive to a change in horse power output of the engine, i. e., the product of torque and revolutions per minute, rather than to torque alone as in the present invention where the control chamber delivers air to the down-stream or engine side of the butterfly or throttle. If connected in accordance with the present invention, the richness of the mixture will vary quite independently of engine speed and will be responsive to torque.

The control chamber in the present invention is placed in pressure-transferring relationship with the fuel or other material being delivered to the air intake passage. Correspondingly, the pressure or head effective in delivering fuel to the engine will be proportional to manifold vacuum, which in turn is responsive to the degree to which the cylinder is filled in each separate stroke, irrespective of engine speed. Correspondingly, my device is subject to developed mean effective pressure in the combustion chamber, which mean effective pressure is proportional to torque. Differently stated, fuel is fed to the mixing device in my system at a rate which is inversely proportional to manifold vacuum.

No satisfactory system is now available for accurately proportioning a material to an internal combustion engine in response to torque developed. It is an object of the present invention to provide such a system which is extremely simple and which avoids excessive moving parts.

Further objects and advantages of the invention will be made evident hereinafter.

The accompanying drawings are largely diagrammatic to facilitate understanding of the invention. It should thus be understood that the position of the elements, the shape and size thereof, and other structural details can be modified without departing from the spirit of the invention.

Referring to the drawings.

Figure 1:
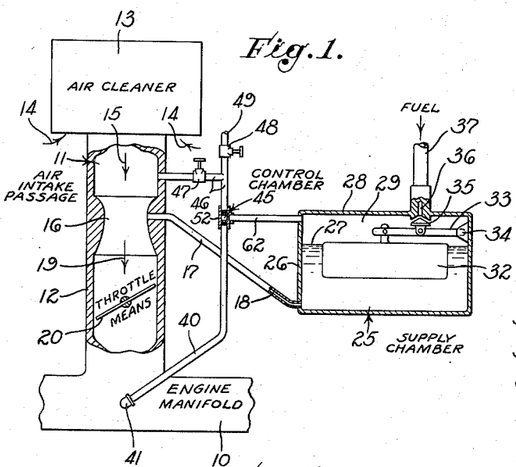
Figure 1 is a diagrammatic view, partially in section, showing the invention applied to the proportioning of a liquid fuel, such as gasoline, to the manifold of an internal combustion engine.

The invention will first be described with reference to its use in producing various air-fuel mixtures. Referring particularly to Figure 1, a manifold of the internal combustion engine is indicated generally by the numeral 10. During operation of the engine, a vacuum is created in the manifold and air necessary for combustion is drawn through an air intake passage 11 formed by a pipe 12. It is often desirable to filter or clean the incoming air and an air cleaner 13 is shown diagrammatically in this connection, the air entering as indicated by arrows 14 and being delivered from the air cleaner to move through the air intake passage 11, as shown by the arrow 15.

In the type of carburetor shown in Figure 1, the air passes through a venturi 16 which serves as a mixing device for the fuel and the air. The fuel enters the throat of the venturi 16 through a pipe 17 providing a supply passage 18. As the fuel enters the air stream moving through the venturi, it is mixed intimately therewith and the mixture moves toward the manifold 10, as indicated by the arrow 19. To control the amount of the mixture delivered to the manifold 10 and thence to the engine, any desired type of throttle 20 can be used. In Figure 1, this throttle is shown as a butterfly.

The supply passage 17 communicates with a supply chamber 25 containing fuel and formed by a container 26. In the embodiment shown, this supply chamber contains a body of gasoline, the surface of which is indicated by the numeral 27, this surface being preferably below the point of communication of the supply passage with the throat of the venturi 16 so as to prevent drainage by gravitational flow. The upper end of the container 26 is closed by a cover 28 to form a space 29 above the surface 27. In the event that the invention is being adapted to conventional carburetors, it is desirable to close off any vent which may be provided in the cover 28.

The fuel, such as gasoline, is delivered to the supply chamber 25 in any suitable way, preferably in a manner to maintain the position of the surface 27 approximately uniform from time to time. This is conventionally accomplished by use of a float-operated valve, which is diagrammatically shown in Figure 1 as including a float 32 secured to a lever 33 pivoted at 34 and carrying a valve element 35. As the float moves upward, this valve element closes a fuel delivery orifice 36 to which fuel is supplied through a pipe 37 in any conventional manner.

The invention includes a suitable means for delivering a small stream of air or other gas to the air intake passage 11 at a position downstream from the butterfly 20. In the illustrated embodiment, a conduit 40 serves in part this purpose, and is shown as being connected to the manifold 10 through a pipe elbow 41. This conduit extends to a control chamber 45 forming an important part of the invention and which will be subsequently described. The air enters this control chamber through a pipe 46 communicating with the air intake passage 11 at a point between the venturi 16 and the air cleaner 13. In this event, a small stream of air will flow through the pipe 46 and conduit 40 in bypassing relationship with the venturi 16. However, it is not always essential that the air be drawn from the air intake passage 11. If desired, a valve 47 in the pipe 46 can be closed and a valve 48 opened so that air is drawn from the open atmosphere into a pipe 49 and thence through the control chamber 45. In some instances, each of the valves 47 and 48 may be opened to a desired extent but, in practice, it is usually possible to eliminate either the pipe 49 or the pipe 46. If the air cleaner 13 is used, I prefer to draw the air into the control chamber through the pipe 46 and to have this pipe communicate with the air intake passage at a position close to the venturi 16. In this manner, the system balances for the restriction created by the air cleaner. In addition, it compensates for the pressure drop due to the air flow in the upper portion of the pipe 12, as well as for the pressure drop in the air cleaner itself. Furthermore, this system prevents dirt from entering the control chamber and the manifold of the engine.

It is an important feature of the invention that the air moving through the control chamber should be so throttled as to maintain in this control chamber an absolute pressure proportional to the absolute pressure on the down-stream side of the throttle. To accomplish this result, I prefer to throttle this small stream of air at two spaced sections to obtain therebetween an intermediate pressure which varies in response to manifold pressure.

Figure 2:
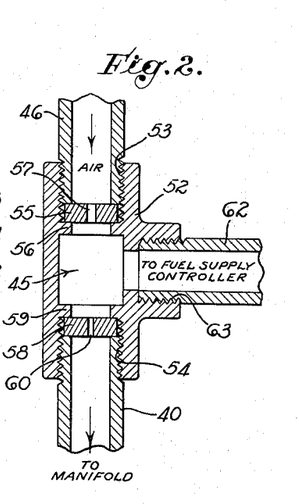
Figure 2 is an enlarged sectional view of the control chamber shown in Figure 1.

A simple way of accomplishing this is by use of a control chamber, such as shown in Figure 2. Referring to this figure, the control chamber 45 is shown as being defined by a pipe T 52 providing an upper cavity 53 into which the pipe 46 is threaded and a lower cavity 54 into which the conduit 40 is threaded. An upper orifice plate 55 is disposed in the upper cavity 53, being pressed against a shoulder 56 by the pipe 46. This upper orifice plate provides an orifice 57 for restricting the air entering the control chamber 45. Similarly, a lower orifice plate 58 is disposed in the lower cavity 54, being held against a shoulder 59 by the conduit 40. An orifice 60 is provided therein through which the air must pass in moving from the control chamber 45 to the engine.

In practice, it is usually desirable that the orifice 57 be slightly larger than the orifice 60 as it is not essential to have a vacuum in the control chamber which is more than a small fraction of the vacuum present in the manifold. However, this size relationship is not necessary in all instances. It should be distinctly understood that the invention is not limited to the use of separate orifice plates. In many instances, it is quite possible to design the conduit 40 and the pipe 46 to be of such internal size as to give the desired effect or to use the valves 47 and 48, or either of them, as a substitute or accessory for the throttle plate 55. However, the embodiment shown in Figure 2 is one adaptable for widely-varying installations in that the orifice plates can be changed to meet particular circumstances and can be replaced to effect variations after the unit is installed.

Means is provided for placing the control chamber 45 in pressure-transferring relationship with the fuel or other material being proportioned into the engine. In the embodiment shown in Figures 1 and 2, this is accomplished by placing the control chamber in direct communication with the fuel-supply controller, e. g., with the chamber 29 above the fuel in the supply chamber 25. A pipe 62 is shown in this connection, this pipe being threaded into a cavity 63 of the pipe T 52.

The mode of operation of the carburetion system thus far described is as follows. A small stream of air is drawn by manifold vacuum through the control chamber, the orifices 57 and 60 being of such size as to maintain in this control chamber an absolute pressure proportional to the absolute pressure in the manifold. The pressure in the control chamber is transmitted to the fuel supply chamber 25 and is effective to modify the pressure on the surface 27. In the absence of my invention and with the supply chamber 25 vented to the atmosphere, the pressure on the surface 27 remains atmospheric so that fuel is drawn through the supply passage 18 to the venturi 16 only in response to the vacuum conditions therein. However, in my invention, the changes in pressure in the chamber 29 serve to control to some extent the amount of fuel delivered. When a low vacuum is drawn on this chamber, the pressure head at the point of communication of the supply passage 18 will be less than if the pressure in the chamber 29 remained atmospheric. Changes in pressure in the chamber 29 act in a manner similar to increasing and decreasing the actual liquid head of the fuel in this chamber. Correspondingly, in my system the amount of fuel delivered to the engine is controlled by the balance between the pressure conditions in the venturi 16 and in the chamber 29.

Figures 6, 7:
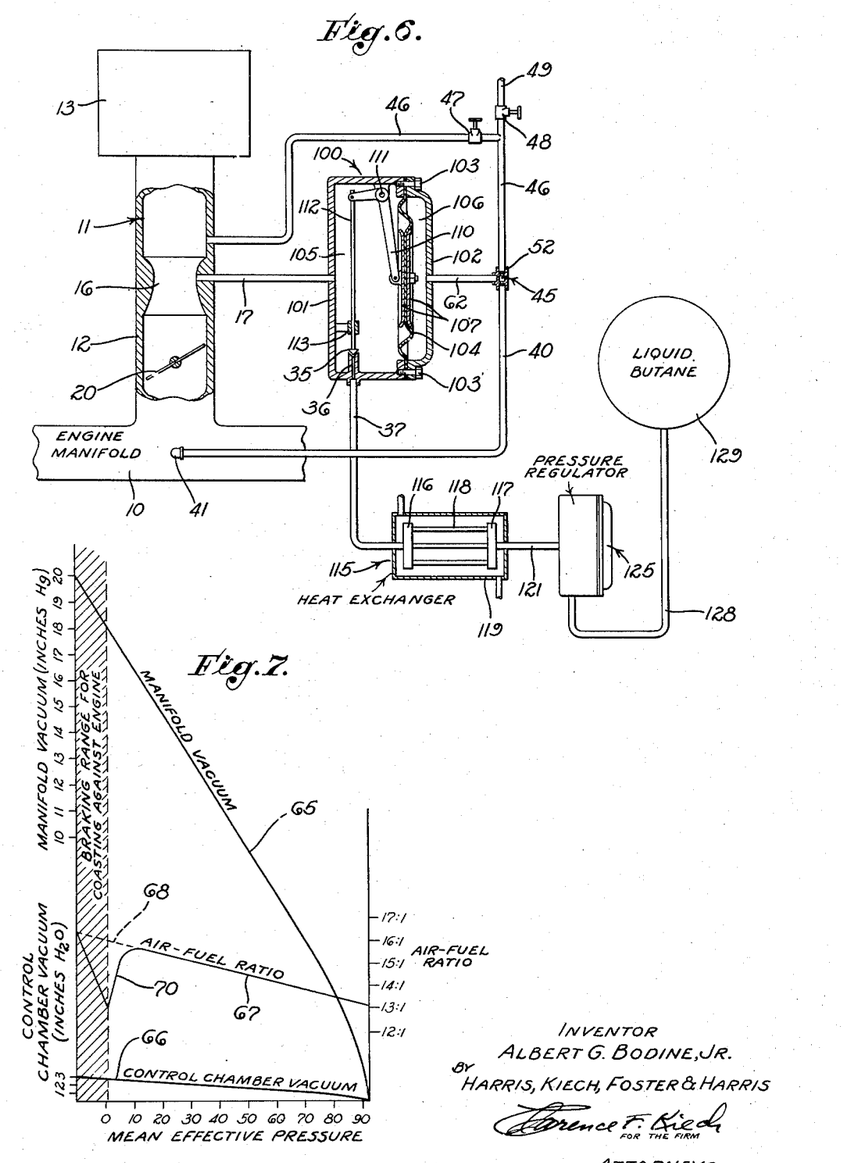
Figure 6 is a view, partially in section, showing diagrammatically the manner in which the invention can be applied to the proportioning of gaseous materials, for example propane, butane, etc., to an internal combustion engine.
Figure 7 is a graph showing curves derived from actual tests of the invention.

In Figure 7 is shown graphically a typical test on a heavy duty engine. This test, while taken on an engine operating on butane, produced curves which are very similar to those obtainable on a gasoline engine. Referring to Figure 7, the abscissa scale represents mean effective pressure in the combustion chamber. This is proportional to torque and inversely proportional to manifold vacuum. The left-hand ordinate represents vacuum and the right-hand ordinate represents air-fuel ratio. The curve 65 shows the decrease in manifold vacuum with increasing load. The curve 66 shows the proportional variations in vacuum in the control chamber. The air-fuel ratio is shown by the full-line curve 67 if the carburetor is equipped with a conventional idling jet. In the absence of the idling jet, the left-hand end of the air-fuel ratio curve will assume the dotted line position 68. The portion 70 of the full-line or fuel-ratio curve 67 deviates from the dotted line portion 68 because of the coming into operation of the idling jet. It will be apparent from Figure 7 that the richness of the mixture increases in substantially a straight line relation with increase in mean effective pressure or torque, this straight line relation being modified only by the presence of an idling jet which, if desired, can be used in any of the embodiments of the invention without departing from the spirit thereof.

It will be apparent further that the proportioning of the fuel is controlled without mechanical devices. Attempts have been made to vary the amount of fuel by use of piston-actuated valves. In practice, however, even though these valves are spring-loaded, the friction between the piston and the cylinder is such as to preclude accurate proportioning, the piston moving in finite increments as distinct from the infinitesimal steps in the present invention. Furthermore, such piston-actuated valves have been used to control very small amounts of fuel and are subject to clogging and erratic operation, as distinct from the present invention which involves no element of mechanical friction and which controls by changing the total amount of fuel delivered to the air intake passage rather than by adding to or subtracting from a given flow extremely small amounts of fuel.

Figures 3, 4, 5:
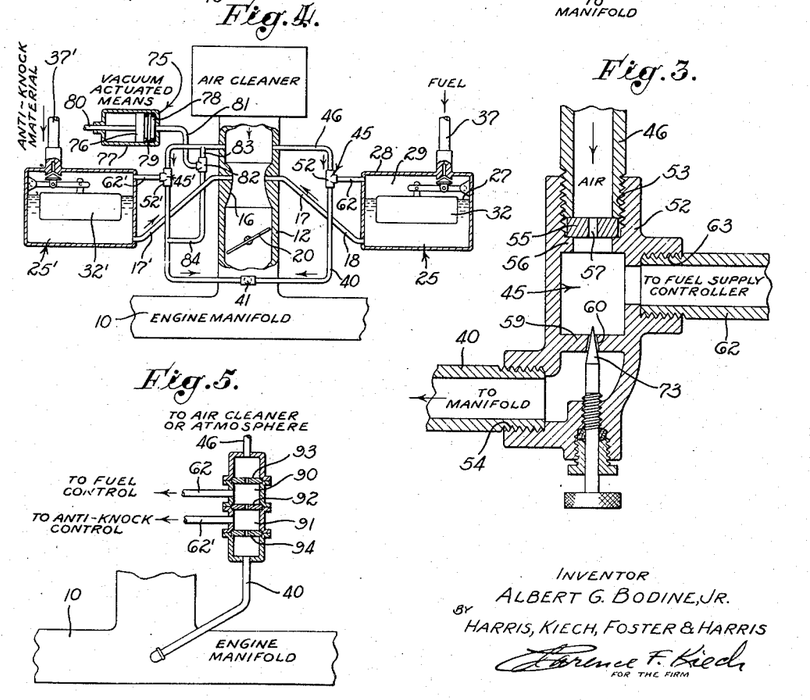
Figure 3 is a sectional view of an alternative embodiment of the control chamber in which a variable restriction is used.
Figure 4 shows the manner in which the invention can be used to proportion various materials to an internal combustion engine and to control the operation of various accessories, the showing including the simultaneous proportioning of two different materials.
Figure 5 is a view, partially in section, showing a modified control chamber which can be used to proportion two materials.

It is sometimes desirable to be able to adjust orifice size to secure optimum conditions when installing the device of my invention. In Figure 3, a needle valve 73 extends, for example, into the orifice 60, which, in this instance, is formed by the inward-extending walls 59. By adjusting the needle valve, the ratio of pressure between the control chamber and the intake manifold can be varied.

In the right-hand portion of Figure 4 is shown a fuel control system similar to that shown in Figure 1 and which can be used to vary the air-fuel mixture. On the left-hand side of this view is shown a similar system used to proportion an anti-knock material into the engine. Corresponding parts are indicated by primed numerals and it will be clear that this system for proportioning anti-knock material can be used whether the proportion of the fuel is controlled in accordance with the invention or by conventional carburetors. The anti-knock material may be any of those materials having the property of increasing the octane rating of gasoline when present in the combustible mixture. On the other hand, the system shown in the left-hand portion of Figure 4 can be used for proportioning any other material to an engine, irrespective of whether this material has anti-knock properties. All that is necessary is to deliver the material under pressure to the pipe 37' so as to maintain the body of this material in the supply chamber 25' as controlled by a float 32'.

The material is moved through the pipe 17' to the venturi 16. It may be mixed with the air and with the fuel in this venturi and the amount of the material delivered to the venturi is controlled by the flow through the control chamber 45' and its connections, as previously described. If an anti-knock material is being introduced into the combustible mixture, it is particularly advantageous to control this introduction in response to torque, for it is when the engine is developing the most torque that the anti-knock material is needed most. This system can be adjusted so as not to deliver anti-knock material during conditions of idling, and it is of distinct advantage to be able to supply this material in amount sufficient to meet the needs of the engine when operating at any particular torque.

The invention can also be used to operate various control elements, for example a vacuum-actuated means, indicated in general in Figure 4 by the numeral 75, shown as including a control element, such as a piston 76 operating in a cylinder 77 and moving rightward against the action of a spring 78 when a vacuum is induced in a vacuum chamber 79. A piston rod 80 extends from the vacuum chamber 77 and can be used to actuate any desired means, for example an indication or control means, various auxiliaries associated with the engine, clutches, transmissions, superchargers, ignition-timing controls, etc.

The vacuum chamber 79 is connected by pipe 81 with a control chamber 82, similar to that previously described. This control chamber is connected in parallel relationship with regard to the control chamber 45' by pipes 83 and 84, though it will be clear that these pipes can separately communicate with the air intake passage in the manifold at a section beyond the throttle 20, if desired.

In Figure 5 is shown a series connection of orifices for controlling the supply of fuel and anti-knock or other material to the engine. For example, pipes 62 and 62' are shown connected to chambers 90 and 91, respectively separated by an orifice plate 92. Orifice plates 93 and 94 are provided respectively above and below the chambers 90 and 91. In this device, air is drawn through the pipe 46 through the orifices in the plates 92, 93, and 94, and thence moves through the conduit 40 to the manifold 10. Using various sized orifices in the plates 92, 93, and 94, the pressures in the chambers 90 and 91 can be kept proportional to each other and proportional to the absolute pressure in the intake manifold.

In Figure 6 is shown diagrammatically the method of applying the invention to gaseous fuels, for example fuels derived from a liquefied normally gaseous hydrocarbon such as propane, butane, natural gas, etc. For purpose of definiteness, the system will be described with reference to its mode of operation using commercial butane as a fuel.

Referring particularly to Figure 6, the fuel supply controller in this instance is in the form of a pressure regulator, indicated generally by the numeral 100, comprising a container 101 and a cover 102 detachably connected together as by bolts 103 to hold therebetween a control element comprising a diaphragm 104. The diaphragm divides the internal space into a supply chamber 105 and a space 106, corresponding in many respects to the chamber 25 and the space 29, respectively, in the embodiment shown in Figure 1. The diaphragm 105 may be constructed in any suitable manner, for example corrugated as shown, with plates 107 clamped on opposite sides of the central portion thereof.

When the fuel-supply controller comprises a pressure regulator of this general type, the valve element 35 controlling the admission of fuel to the supply chamber 105 is actuated in response to movements of the diaphragm 104. In the illustrated embodiment, this interconnection is shown diagrammatically as including a bell crank 110 pivoted at 111, one end being secured to the plates 107 and the other end being pivoted to a rod 112 which extends through a suitable journal 113 to the valve element 35. If the pressure in the space 106 increases, the bell crank 110 is moved clockwise to raise the valve element 35 and increase the amount of fuel reaching the supply chamber 105. It will thus be apparent that the pressure in the space 106 controls the pressure in the supply chamber 105 and, correspondingly, controls the amount of fuel delivered through the pipe 17 to the venturi 16.

To control the pressure in the space 106, the pipe 62 communicates therewith and with the control chamber 45 previously described. Also connected to this control chamber are the pipe 46 and conduit 40, previously described, which communicate respectively with the intake manifold 10 and with the air either in the air intake passage 11 or with the atmosphere through the pipe 49.

The pipe 37 for delivering fuel to the supply chamber 105 is usually connected to a heat exchanger 115, which is shown diagrammatically as including headers 116 and 117 with intermediate tubes 118 communicating therebetween, the unit being surrounded by a housing 119 through which may be circulated exhaust gases or the cooling water of the engine or any other heating medium. The header 117 is connected by a pipe 121 to a pressure regulator 125, which may be constructed in any well-known manner but which, if desired, may embody the details of the pressure regulator 100 previously described. The supply line for this pressure regulator is indicated by the numeral 128 and extends to a tank 129 containing liquid butane under a pressure sufficient to maintain the butane in liquid state, for example from 50 to 80 lbs./sq. in.

The mode of operation of the embodiment shown in Figure 6 is as follows. The liquid butane flows through the supply line 128 to the pressure regulator 125 which reduces the pressure to a value in the neighborhood of 15 lbs./sq. in. and maintains the lower pressure at an established level. Heat is applied to the system at one or more points, a simple system being the one shown wherein heat is applied as the fuel flows through the heat exchanger 115, thus insuring that the butane will be in gaseous form at the time it moves through the pipe 37 to the supply chamber 105. Under usual operating conditions, the absolute pressure in the supply chamber is controlled by the diaphragm 104 and will normally be subatmospheric, usually in the neighborhood of −1 in. of mercury, though it will be understood that this absolute pressure changes in response to changes in the absolute pressure in the control chamber 45, whereby the richness of the mixture is changed in response to changes in torque developed by the engine.

It is usually desirable to connect the pressure regulator 100 with the control chamber 45, as suggested in Figure 6, it being desirable that the regulator 100 closest to the air intake passage should be operated by the intermediate pressure in the control chamber.

It will correspondingly be apparent that my invention is applicable to fuel-supply controllers of various construction, whether of the carburetor type shown in Figure 1 or of the pressure-regulator type shown in Figure 6. Likewise, it is applicable to the actuation of a control element, whether this control element be a diaphragm such as indicated at 104, a piston such as indicated at 76, or a part of the carburetion system such as shown in Figure 1.

Likewise, as mentioned above, it is desirable to draw air through the control chamber by connecting the conduit 40 to the air intake passage at a position on the engine side of the throttle 20, or, in other words, on the down-stream side of this throttle. If this conduit was connected at a point up-stream from the throttle, the intermediate pressure in the control chamber would be subject to the total mass of air per minute passing through the air intake passage and the system would be responsive to horse power. For example, if the engine was running at a given load and it was desired to compensate for a reduced load, the throttle would be closed slightly to keep the R. P. M. of the engine substantially the same. If the conduit 40 was connected to the air intake passage on the up-stream side of the throttle, this closing of the throttle would decrease the vacuum in the control chamber and make the mixture richer. With the system as illustrated, a similar slight closing of the throttle would increase the manifold vacuum and make the mixture leaner, which is the effect desired. In my invention, the mixture is varied irrespective of changes in engine speed and, in effect, is varied in response to torque. The changes in mixture are made subject to the degree to which the cylinder is filled on each separate stroke and, correspondingly, the system is responsive to developed mean effective pressure and is preferably not affected substantially by changes in R. P. M. of the engine but, rather, to power developed on each stroke.

While the invention has been particularly described with reference to a fuel control system, it will be apparent from the previous description that it can be used to proportion any material into an internal combustion engine, one of its very desirable uses being the proportioning of an anti-knock material such as tetraethyl lead or other fuel component or fuel supplement to the air intake passage. The invention may also be used to actuate various control elements without departing from the spirit of the invention.

Various other changes and modifications will be apparent to those skilled in the art and are contemplated as within the purview of the appended claims.

I claim as my invention:

1. A method of controlling the supply of anti-knock material to a throttle-equipped internal combustion engine, which method includes the steps of: admitting a large main stream of air to a vacuum zone in which a vacuum is created by said engine when in operation; admitting a small auxiliary stream of air to said vacuum zone at a position downstream from said throttle to mingle with said main stream of air; throttling said small stream of air at spaced sections to induce in an intermediate section therebetween a subatmospheric pressure which rises and falls with an increase and decrease in the subatmospheric pressure induced downstream from said throttle by the operation of said engine under varying load conditions; supplying said anti-knock material to said main air stream; and controlling the rate of supply of said anti-knock material to said main air stream exclusively in response to changes in subatmospheric pressure in said intermediate section.

2. In a device for supplying a material to an internal combustion engine in a manner to respectively increase and decrease the rate of supply of such material in response to a decrease and increase in suction developed by said engine, the combination of: walls defining an air intake passage through which air moves to said engine, said air intake passage including an adjustable throttle means; walls defining a supply chamber; valve means for delivering said material to said supply chamber; means for delivering material from said supply chamber to said air intake passage in amount determined exclusively by the pressure in said supply chamber; a diaphragm forming one wall of said supply chamber; means for adjusting said valve means in response to movement of said diaphragm; and means for moving said diaphragm in step with changes in suction of said internal combustion engine and in a manner to respectively increase and decrease the rate of supply of said material to said air intake passage as the engine suction decreases and increases.

3. In a device for increasing the richness of a combustible mixture supplied to an internal combustion engine in a manner dependent upon change in suction created by said engine, the combination of: walls defining an air intake passage through which air is drawn into said engine, said air intake passage including an adjustable throttle means; walls defining a fuel-containing chamber; walls defining a fixed-sized supply passage communicating between said fuel-containing chamber and said air intake passage for supplying fuel to said passage in amount determined by the pressure in said fuel-containing chamber; and means for varying the pressure acting to move said fuel into said air intake passage through said supply passage, said means including walls defining a control chamber, a conduit connecting said control chamber to said air intake passage at a position on the downstream side of said throttle means and including a sufficient fixed-area restriction to create a pressure differential between said control chamber and said air intake passage when air is drawn into said air intake passage through said control chamber, means for restricting the entry of air to said control chamber to develop therein an absolute pressure varying with but higher than the absolute pressure in said air intake passage at the point of communication of said conduit therewith, and means for applying said absolute pressure in said control chamber to said fuel-containing chamber to control the amount of fuel supplied through said supply passage to said air intake passage and thus control the air-fuel ratio.

4. In a system for supplying anti-knock material to an internal combustion engine and for increasing and decreasing the amount of said material respectively with decrease in suction of said engine, the combination of: walls defining an air intake passage through which air is supplied to said engine, said air intake passage including an adjustable throttle means; means for supplying fuel to said air intake passage to form a combustible mixture; a container for said antiknock material; walls defining a supply passage communicating between said container and said air intake passage for delivering said anti-knock material thereto; means for developing a subatmospheric pressure which varies substantially proportionally with the pressure on the downstream side of said throttle means, said means including means for delivering a small auxiliary stream of air to said downstream side of said throttle means to join with the air moving along said air intake passage, and means for restricting said auxiliary stream of air at two spaced positions to develop a subatmospheric pressure in a zone between said spaced positions which varies with the pressure downstream of said throttle means; and means for transferring pressure between said zone and said container to vary the amount of said anti-knock material supplied to said air intake passage through said supply passage.

5. A combination as defined in claim 4, in which said air intake passage includes a mixing zone and in which said means for supplying fuel to said air intake passage includes fuel-conducting means communicating with said mixing zone, and in which said supply passage delivering anti-knock material to said air intake passage communicates with said mixing zone.

6. In an apparatus for controlling the delivery of a material to an air intake passage carrying a main stream of air to a fuel-consuming device, said air intake passage providing a throttle means and the absolute pressure in said air intake passage downstream from said throttle means varying in accordance with changes in operation of said fuel-consuming device, the combination of: walls defining a fixed-sized supply passage communicating with said air intake passage for supplying said material thereto; and means for varying the pressure acting to move said material into said air intake passage through said fixed-sized supply passage, said means including walls defining a control chamber in pressure-transferring relationship with said material supplied to said supply passage, a conduit connecting said control chamber to said air intake passage at a position downstream from said throttle means for supplying an auxiliary stream of air to said air intake passage in addition to said main stream moving therethrough to said fuel-consuming device, said conduit including a sufficient restriction to create a pressure differential between said control chamber and said air intake passage when said auxiliary stream of air moves into said air intake passage through said control chamber, and means for restricting the entry of air into said control chamber to maintain therein an absolute pressure proportional to the absolute pressure in said air intake passage downstream from said throttle means.

7. In an apparatus for controlling the delivery of a material to an air intake passage carrying a main stream of air to a fuel-consuming device, said air intake passage providing a throttle means and the absolute pressure in said air intake passage downstream from said throttle means varying in accordance with changes in operation of said fuel-consuming device, the combination of: walls defining a supply chamber containing said material; walls defining a fixed-sized supply passage for delivering said material from said supply chamber to said air intake passage; and means for varying the pressure effective to move said material into said air intake passage through said fixed-sized supply passage, said means including walls defining a control chamber, means for transferring pressure between said control chamber and the material in said supply chamber, a conduit connecting said control chamber to said air intake passage at a position downstream from said throttle means for supplying an auxiliary stream of air to said air intake passage in addition to said main stream moving therethrough to said fuel-consuming device, said conduit including a sufficient restriction to create a pressure differential between said control chamber and said air intake passage when said auxiliary stream of air moves into said air intake passage through said control chamber, and means for restricting the entry of air into said control chamber to maintain therein an absolute pressure related to the absolute pressure in said air intake passage downstream from said throttle means.

8. A combination as defined in claim 6, in which said restriction in said conduit comprises an orifice means including an opening of fixed size and of smaller cross-sectional area than the interior of said conduit.

9. A combination as defined in claim 6, in which said restriction in said conduit is of smaller cross-sectional area than the means for restricting the entry of air into said control chamber.

10. A combination as defined in claim 6, in which said means for restricting the entry of air into said control chamber comprises an orifice means including an opening of fixed size of a smaller cross-sectional area than the interior of said conduit, and in which said restriction in said conduit comprises an adjustable orifice means.

11. A combination as defined in claim 7, in which said supply chamber contains a liquid comprising said material, and in which said means for transferring pressure between said control chamber and said material in said supply chamber comprises a passage opening on said supply chamber at a position above the level of the liquid therein.

12. A combination as defined in claim 7, in which said material in said supply chamber comprises a gaseous fuel, and in which said means for transferring pressure between said control chamber and the material in said supply chamber comprises a diaphragm in pressure-transferring relationship with the material in said supply chamber, and means rendering said diaphragm responsive to changes in pressure in said control chamber.

13. In an apparatus for controlling the delivery of a material to an air intake passage carrying a main stream of air to a fuel-consuming device, said air intake passage providing a throttle means and the absolute pressure in said air intake passage downstream from said throttle means varying in accordance with changes in operation of said fuel-consuming device, the combination of: walls defining a fixed-sized supply passage communicating with said air intake passage for supplying said material thereto; means for delivering an auxiliary stream of air to said air intake passage at a position on the downstream side of said throttle means to join the main stream moving toward said fuel-consuming device, the amount of air entering said air intake passage by way of said auxiliary stream being determined by the absolute pressure in said air intake passage downstream from said throttle means; means for throttling said auxiliary stream of air at spaced positions to establish in the intervening space an absolute pressure substantially proportional to the absolute pressure in said air intake passage downstream from said throttle means; and means for controlling the amount of said material supplied to said air intake passage through said supply passage in response to changes in absolute pressure in said intervening space.

14. In an apparatus for controlling the delivery of a material to an air intake passage carrying a main stream of air to a fuel-consuming device, said air intake passage providing a throttle means and the absolute pressure in said air intake passage downstream from said throttle means varying in accordance with changes in operation of said fuel-consuming device, the combination of: walls defining a fixed-sized supply passage communicating with said air intake passage for supplying said material thereto; a conduit means providing ends communicating respectively with said air intake passage at positions upstream and downstream with respect to said throttle means whereby an auxiliary stream of air moves through said conduit means in bypassing relationship with said throttle means, said conduit means including a control chamber intermediate said ends and including sufficient restrictions between said control chamber and each of said ends to develop in said control chamber an absolute pressure which varies substantially proportionally with the pressure differential within said air intake passage on opposite sides of said throttle means; and means for controlling the amount of material delivered to said supply passage in response to changes in said absolute pressure in said control chamber.

15. In an apparatus for forming a combustible fuel charge for a fuel-consuming device, the combination of: walls defining an air intake passage through which a main stream of air moves to said fuel-consuming device; a throttle means in said air intake passage, the absolute pressure in said air intake passage downstream from said throttle means varying in accordance with fuel demands of said fuel-consuming device, said absolute pressure being below atmospheric pressure during operation of and due to the action of said fuel-consuming device; passage means for delivering fuel to said air intake passage to mix with said main stream of air, said passage means including a fuel chamber to which fuel flows on its way to said air intake passage and a fixed-sized fuel passage through which fuel is drawn from said fuel chamber into said air intake passage by the subatmospheric pressure in said air intake passage; and means for varying the fuel-air ratio upon change in the absolute pressure in said air intake passage downstream from said throttle means, said ratio-varying means including a conduit means for admitting an auxiliary stream of air to said air intake passage at a position downstream from said throttle means, the amount of air entering said air intake passage by way of said conduit means being determined by said absolute pressure downstream from said throttle means, said conduit means providing a control chamber intermediate its ends and providing sufficient restrictions between each of said ends and said control chamber to establish in said control chamber an absolute pressure substantially proportional to the absolute pressure in said air intake passage downstream from said throttle means, and said ratio-varying means including means for changing the pressure in said fuel chamber in accordance with changes in said absolute pressure in said control chamber to proportion the fuel into said air intake passage under the exclusive control of the absolute pressure in said control chamber.

16. In an apparatus for controlling the delivery of a material to an air intake passage carrying a main stream of air to a fuel-consuming device, said air intake passage providing a throttle means, the absolute pressure in said air intake passage at a position downstream from said throttle means being below atmospheric pressure during operation of and due to the action of said fuel-consuming device, the combination of: passage means for delivering said material to said air intake passage to mix with said main stream of air, said means including a supply chamber through which said material flows on its way to said air intake passage and a fixed-sized delivery passage through which said material is drawn from said delivery passage into said air intake passage by the existence of subatmospheric pressure in said air intake passage; a single adjustable valve means for controlling the flow of said material through said passage means to said air intake passage; a conduit means for admitting an auxiliary stream of air to said air intake passage at a position downstream from said throttle means to mix with the air of said main stream, the amount of air entering said air intake passage by way of said conduit means being determined by said absolute pressure downstream from said throttle means, said conduit means providing a control chamber intermediate its ends and providing sufficient restrictions between each of said ends and said control chamber to establish in said control chamber an absolute pressure substantially proportional to the absolute pressure in said air intake passage downstream from said throttle means; and means for varying said single adjustable valve means in response to changes in absolute pressure in said control chamber to control the amount of said material moving through said passage means to said air intake passage.

17. In an apparatus for controlling the delivery of a material to an air intake passage carrying a main stream of air to a fuel-consuming device, said air intake passage providing a throttle means, the absolute pressure in said air intake passage at a position downstream from said throttle means being below atmospheric and varying with changes in operation of said fuel-consuming device, the combination of: fixed-sized passage means for delivering a stream of said material to said air intake passage to mix with said main stream of air; a pressure regulator providing a chamber bounded on one side by a diaphragm and providing a valve means operatively connected to said diaphragm, said valve means being the exclusive means controlling said stream of material moving to said air intake passage through said fixed-sized passage means and one side of said diaphragm being exposed to the pressure of said stream on the discharge side of said valve means; and a conduit means for admitting an auxiliary stream of air to said air intake passage at a position downstream from said throttle means, said conduit means providing a control chamber intermediate its ends and providing sufficient restrictions between each of said ends and said control chamber to establish in said control chamber an absolute pressure substantially proportional to the absolute pressure in said air intake passage downstream from said throttle means, the pressure in said control chamber acting upon the other side of said diaphragm.

18. In an apparatus for controlling the delivery of a material to an air intake passage carrying a main stream of air to a fuel-consuming device, said air intake passage providing a throttle means, the absolute pressure in said air intake passage at a position downstream from said throttle means being below atmospheric pressure and varying with changes in operation of said fuel-consuming device, the combination of: a single adjustable valve means controlling the admission of said material to said air intake passage to mix with the air stream therein; a diaphragm; means for operatively connecting said diaphragm and said valve means for controlling the flow of said material to said air intake passage in response to movement of said diaphragm; means for varying the pressure on one side of said diaphragm in response to changes in the amount of air moving to said fuel-consuming device through said air intake passage; and vacuum-actuated means for controlling the pressure on the other side of said diaphragm, said vacuum-actuated means including a conduit means for admitting an auxiliary stream of air to said air intake passage at a position downstream from said throttle means, said conduit means providing a control chamber spaced from said diaphragm and providing sufficient restrictions for the auxiliary stream of air entering said control chamber and moving from said control chamber to said air intake passage at a position downstream from said throttle means to establish in said control chamber a pressure substantially proportional to the absolute pressure in said air intake passage at said position downstream from said throttle means, said vacuum-actuated means including a pipe means openly communicating between said control chamber and said other side of said diaphragm to transmit to said diaphragm the pressure variations of said control chamber.

19. In an apparatus for forming a combustible fuel charge for a fuel-consuming device, the combination of: walls defining an air intake passage through which a main stream of air moves to said fuel-consuming device, said air intake passage including a throttle means and a venturi, the absolute pressure in said air intake passage downstream from said throttle means varying in accordance with fuel demands of said fuel-consuming device, said absolute pressure being below atmospheric pressure during operation of and due to the action of said fuel-consuming device; a fuel-supply passage communicating with said venturi; a pressure regulator providing first and second chambers separated by a diaphragm, said first chamber communicating with said fuel-supply passage; a single adjustable valve means for controlling the flow of fuel through said fuel-supply passage; means for operatively connecting said valve means and said diaphragm; and means for maintaining in said second chamber a subatmospheric pressure substantially proportional to the subatmospheric pressure on said downstream side of said throttle means.

20. In combination with an air intake passage carrying a main stream of air to a fuel-consuming device, said air intake passage providing a throttle means, the absolute pressure in said air intake passage downstream from said throttle means being below atmospheric pressure and varying in accordance with changes in operation of said fuel-consuming device: a vacuum-actuated means providing a movable wall; conduit means for continuously admitting an auxiliary stream of air to said air intake passage at a position downstream from said throttle means to join said main stream of air, said position being spaced from the zone of movement of said throttle means, said conduit means providing a control chamber intermediate its ends and through which moves said auxiliary stream of air and providing sufficient restrictions between each of said ends and said control chamber to establish in said control chamber an absolute pressure substantially proportional to the absolute pressure in said air intake passage downstream from said throttle means, said control chamber being spaced from said vacuum-actuated means; and an open pipe, and means for delivering the pressure variations in said control chamber to said vacuum-actuated means to change the position of said movable wall.

21. A method for controlling the supply of a material to a throttle-equipped air intake passage in which a variable vacuum exists on the downstream side of the throttle and through which a main stream of air moves to a device, which method includes the steps of: utilizing said variable vacuum to draw into said air intake passage at a position downstream from said throttle a small auxiliary stream of air which joins said main stream of air at said downstream position; throttling said small stream of air at two spaced sections in such manner that the absolute pressure between said spaced sections varies substantially proportionally with the absolute pressure in said air intake passage at said position downstream from said throttle; delivering a stream of said material to said air intake passage to mix with the air flowing therethrough; and increasing and decreasing the amount of said material thus delivered to said air intake passage exclusively in direct proportion to an increase and decrease in the absolute pressure between said two spaced sections.

ALBERT G. BODINE, Jr.

CERTIFICATE OF CORRECTION.

Patent No. 2,377,607. June 5, 1945.

ALBERT G. BODINE, JR.

It is hereby certified that error appears in the printed specification of the above numbered patent requiring correction as follows: Page 5, second column, line 73, claim 4, after "decrease" insert the words --and increase--; and that the said Letters Patent should be read with this correction therein that the same may conform to the record of the case in the Patent Office.

Signed and sealed this 11th day of September, A. D. 1945.

Leslie Frazer (Seal) First Assistant Commissioner of Patents.